A method, apparatus, system, and signal-bearing medium that in an embodiment receive a keyword from a client, create search results for the keyword via an index. Context information is determined from the search results using a file name and a topic name as a key. A context tag is then created in a search-results page. The context tag includes the context information. When the context tag is interpreted at the client, it causes the context information to be displayed after the search results are selected. In this way, a user may more easily determine the relevant search results.

(12) United States Patent
Benysh et al.

(10) Patent No.: US 7,472,115 B2
(45) Date of Patent: Dec. 30, 2008

(54) CONTEXTUAL FLYOUT FOR SEARCH RESULTS

(75) Inventors: Darel Vincent Benysh, Rochester, MN (US); David Joseph Borrillo, Rochester, MN (US); Matthew Jacob Bruzek, Rochester, MN (US); Nikolay Alexis Coates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 10/835,466

(22) Filed: Apr. 29, 2004

(65) Prior Publication Data
US 2005/0246320 A1 Nov. 3, 2005

(51) Int. Cl.
G06F 17/30 (2006.01)
G06F 7/00 (2006.01)
(52) U.S. Cl. .................. 707/3; 707/4; 707/5
(58) Field of Classification Search ........... 707/3
See application file for complete search history.

(56) References Cited

U.S. PATENT DOCUMENTS 6,138,129 A * 10/2000 Combs ............ 707/6
6,282,512 B1 * 8/2001 Hemphill ........... 704/270.1
2002/0078143 A1 * 6/2002 De Boor et al. ....... 709/203
2002/0152202 A1 * 10/2002 Perro et al. ............ 707/3
2003/0217059 A1 * 11/2003 Allen et al. ........... 707/10
2004/0006740 A1 * 1/2004 Krohn et al. .......... 715/513

OTHER PUBLICATIONS

Power Google http://novella.mhhe.com/sites/0079876543/student_view0/power_google.html., specially chapter 9, pp. 47-53, copyright 2003 by McGraw-Hill/Dushkin, Guiford, CT 06437, A Division of the McGraw-Hill Companies.*

* cited by examiner

*Primary Examiner*—Etienne P LeRoux
*Assistant Examiner*—Cindy Nguyen
(74) *Attorney, Agent, or Firm*—Owen J. Gamon (57) ABSTRACT

A method, apparatus, system, and signal-bearing medium that in an embodiment receive a keyword from a client, create search results for the keyword via an index. Context information is determined from the search results using a file name and a topic name as a key. A context tag is then created in a search-results page. The context tag includes the context information. When the context tag is interpreted at the client, it causes the context information to be displayed after the search results are selected. In this way, a user may more easily determine the relevant search results.

12 Claims, 5 Drawing Sheets

```
<HTML>

...      405

<IMG ALT="PROGRAMMING>LANGUAGES>JAVA>APIS"
SRC="FLYOUT2.GIF" BORDER="0">

...

</HTML>
```

CONTEXTUAL FLYOUT FOR SEARCH RESULTS

FIELD

An embodiment of the invention generally relates to computers. In particular, an embodiment of the invention generally relates to a contextual flyout for search results.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware (such as semiconductors, integrated circuits, programmable logic devices, programmable gate arrays, and circuit boards) and software, also known as computer programs.

Years ago, computers were isolated devices that did not communicate with each other. But, today computers are often connected in networks, such as the Internet or World Wide Web, and a user at one computer, often called a client, may wish to access information at multiple other computers, often called servers, via a network. Searching is the primary mechanism used to retrieve information from the Internet. Therefore, improving as much as possible the performance of searching can have a significant impact on the collective time spent by individuals or organizations to find information. Technically speaking, improving search performance means decreasing the time taken for the user to find the desired information.

Decreasing retrieval time has two components. The first component is improving the performance of the software and hardware, so that the actual search time is almost instantaneous. Current technology has nearly made this a reality. Even free, open-source search engines perform at or near this level. The second component to decreasing retrieval time is to reduce the amount of time users take to determine the correct result from among the multitude of returned results. This is where the bulk of the improvement can be realized. For example, when search results are returned from a Web-based search engine, they are usually returned as a linear list of ranked results that have no context within the information structure being viewed, which causes the user difficulty in selecting the result of interest from among the results. Further, in many cases, the results are ambiguous, especially if the title of the pages are similar.

Abstracts are the primary mechanism to help users select from among the top-ranked search results. But, abstracts show information only on one specific page of information; they do not show how the information fits with other pages in a hierarchy or linear progression, such as a tutorial. To remove ambiguity, the user must select the link and view the resultant information to determine if the link points to the desired information.

Another mechanism that is often used in conjunction with abstracts is the display of the URL (Universal Resource Locator) associated with the search results. The URL is an address of the file on the server that contains the search results. The URL may include the domain name and the directory and subdirectory structure where the file is located, which is not necessarily meaningful to the user.

Another mechanism that is used in conjunction with abstracts is categories. For example, some search engines show the category or class of the search result, which helps the user better target the result that is the best. For example, a search for washers might show a result such as: home appliance>washing machine, with "home appliance" being the category to which "washing machine" belongs, which provides contextual information.

Providing contextual information with the results can reduce retrieval times for the search by more quickly allowing the user to remove the ambiguity associated with the top-ranked search results. When the results are returned from the search, they are shown in context of the taxonomy currently being viewed by the user. This method has the advantage that users can see at a glance whether the results are in the category being sought. For example, assume that a Java programmer is searching for a description of the integer data type and the information repository includes C++, C, FORTRAN, and Java programming language information. Example search results, with each representing a link, are:

1. Integer
2. Data types: integers
3. Defining data types as integers.

But, from the above search results, it is not clear which of the search results are relevant to C++, C, FORTRAN, or Java since each of them may have an integer data type. But, when contextual information is included with the search results, the best search result becomes immediately clear:

---

Programming languages
   Java
      data types
         integer
or programming languages/Java/data types/integer.

---

Unfortunately, adding this contextual information in with the search results listing has several disadvantages: it increases navigation difficulty by cluttering the display, it reduces the number of results that can be shown at one time, and it reduces the length of the abstract that can be shown.

Thus, without a better way to present search results, users will continue to need to search through the results listing, looking for the relevant results.

SUMMARY

A method, apparatus, system, and signal-bearing medium are provided that in an embodiment receive a keyword from a client, create search results for the keyword via an index. Context information is determined from the search results using a file name and a topic name as a key. A context tag is then created in a search-results page. The context tag includes the context information. When the context tag is interpreted at the client, it causes the context information to be displayed after the search results are selected. In this way, a user may more easily determine the relevant search results.

DETAILED DESCRIPTION

In an embodiment, a context manager receives a keyword from a client, searches for the keyword using an index, and creates search results for the keyword via the index. Context information is determined from the search results using a file name and a topic name as a key into the index. A context tag is then created in a search-results page. The context tag includes the context information. The search-results page is then sent to the client. When the context tag is interpreted at the client, it causes the context information to be displayed after the search results are selected. In this way, a user may more easily determine the relevant search results.

Figure 1:
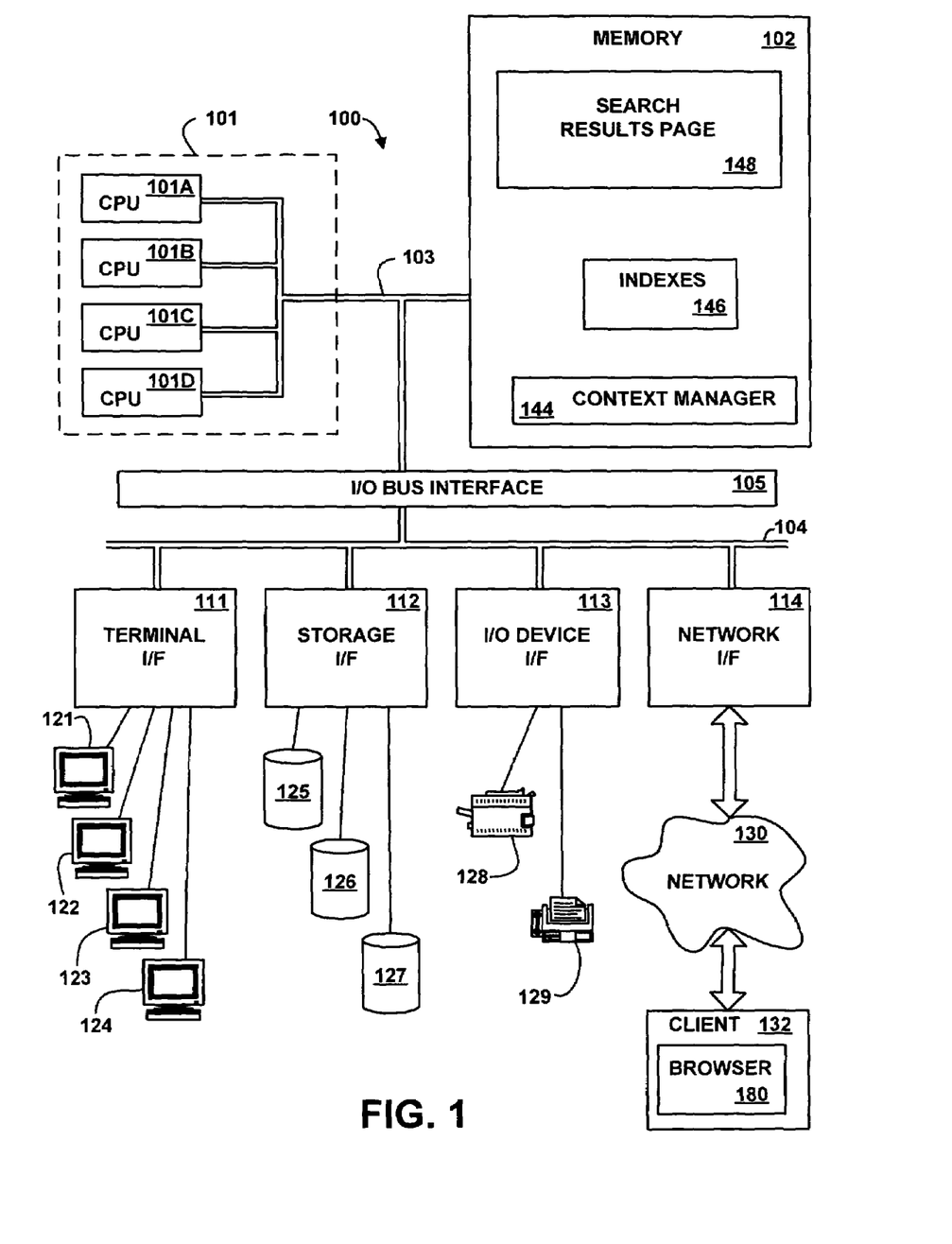
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to a client 132 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a context manager 144, indexes 146, and a search results page 148. Although the context manager 144, the indexes 146, and the search results page 148 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the context manager 144, the indexes 146, and the search results page 148 are illustrated as residing in the memory 102, these elements are not necessarily all completely contained in the same storage device at the same time.

The context manager 144 performs a search for a keyword submitted by the client 132 via the indexes 146. The data that the context manager 144 searches for via the indexes 146 may be present on the computer system 100 or on any other electronic device (unillustrated) attached via the network 130. The context manager 144 prepares results based on the search in the search results page 148, which is sent to the client 132 via the network 130. In an embodiment, the context manager 144 includes instructions capable of executing on the processor 101 or statements capable of being interpreted by instructions executing on the processor 101 to perform the functions as further described below with reference to FIG. 5. In another embodiment, the context manager 144 may be implemented in microcode. In yet another embodiment, the context manager 144 may be implemented in hardware via logic gates and/or other appropriate hardware techniques, in lieu of or in addition to a processor-based system. The search results page 148 is further described below with reference to FIG. 4. A display of the search results page 148 when rendered by the client 132 if further described below with reference to FIG. 3.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be loaded from and stored to the memory 102 as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The client 132 includes a browser 180, which sends search requests to the computer system 100 and receives the search results page 148 from the computer system 100 via the network 130. The browser 180 interprets data and control information within the search results page 148 for display, such as the displays shown in FIGS. 2 and 3. The client 132 may include some or all of the hardware components previously described above for the computer system 100. Although only one client 132 is illustrated, in other embodiments any number of clients may be present.

It should be understood that FIG. 1 is intended to depict the representative major components of the computer system 100 and the client 132 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
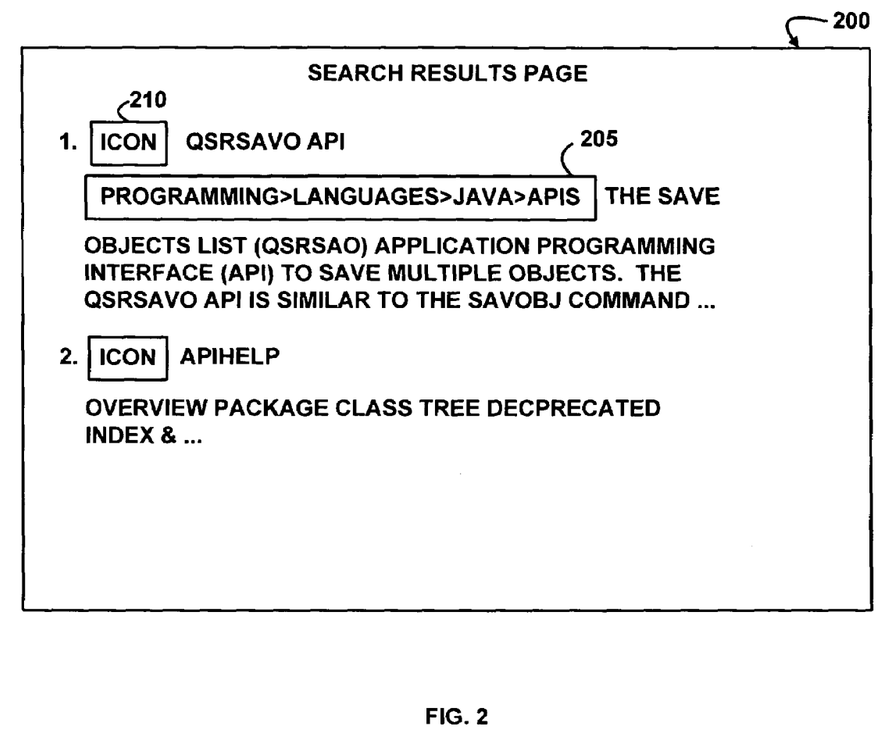
FIG. 2 depicts a pictorial representation of an example user interface for a search results page, according to an embodiment of the invention.

FIG. 2 depicts a pictorial representation of an example user interface 200 for the search results page 148 (FIG. 1), according to an embodiment of the invention. The user interface 200 includes contextual-flyout information 205 and an icon 210. The contextual-flyout information 205 displays context information about the search results. The contextual-flyout information 205 is displayed by the browser 180 in response to a selection of the associated search results or in response to a cursor or other pointer passing over the search results. The browser 180 interprets the control data and information in the search results page 148 to display the contextual-flyout information 205. In this way, the context data in the contextual-flyout information 205 is only temporarily displayed and does not clutter the screen until requested by the user. The contextual-flyout information 205 may overlay all of or only a portion of the associated search results. In another embodiment, the search results are adjusted within the user interface 200, so that all of the associated search results can be seen at the same time as the contextual-flyout information 205. When the icon 210 is selected, the user interface of FIG. 3 is presented, as further described below with reference to FIG. 3.

Figure 3:
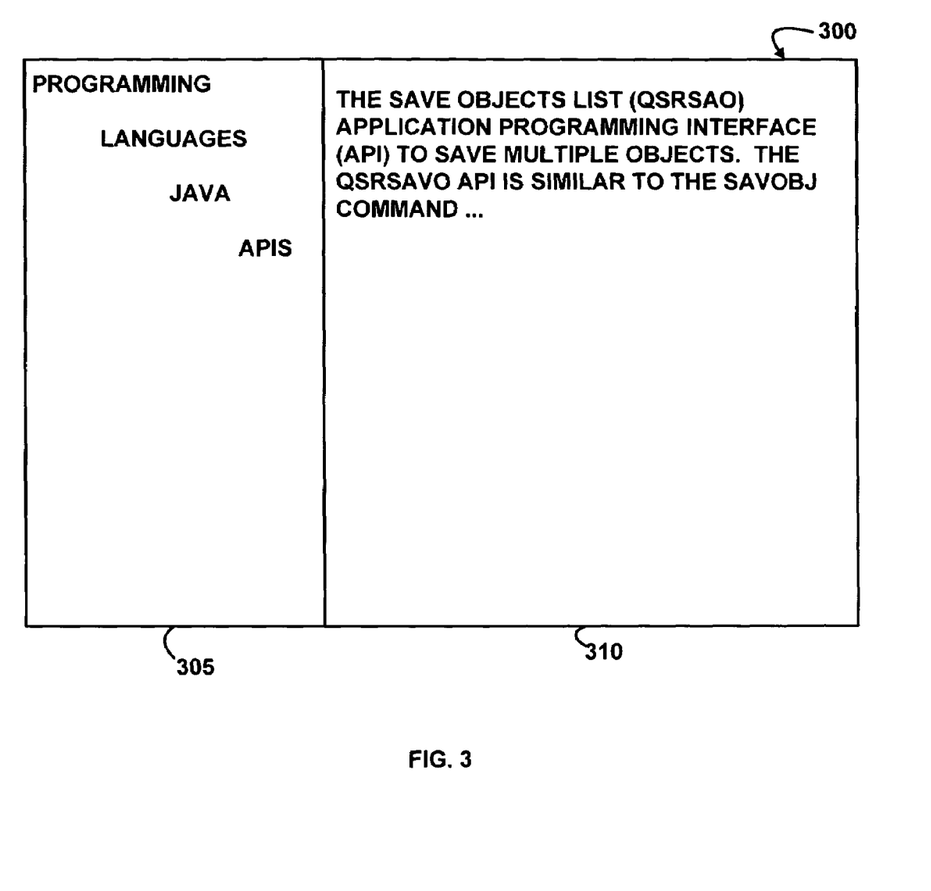
FIG. 3 depicts a pictorial representation of an example user interface for a more detailed search results page, according to an embodiment of the invention.

FIG. 3 depicts a pictorial representation of an example user interface 300 for a more detailed search results page, according to an embodiment of the invention. In response to the selection of the icon 210 (FIG. 2), the browser 180 interprets the search results page 148 to display the contextual flyout information in a separate frame 305 along with the search results frame 310.

Figure 4:
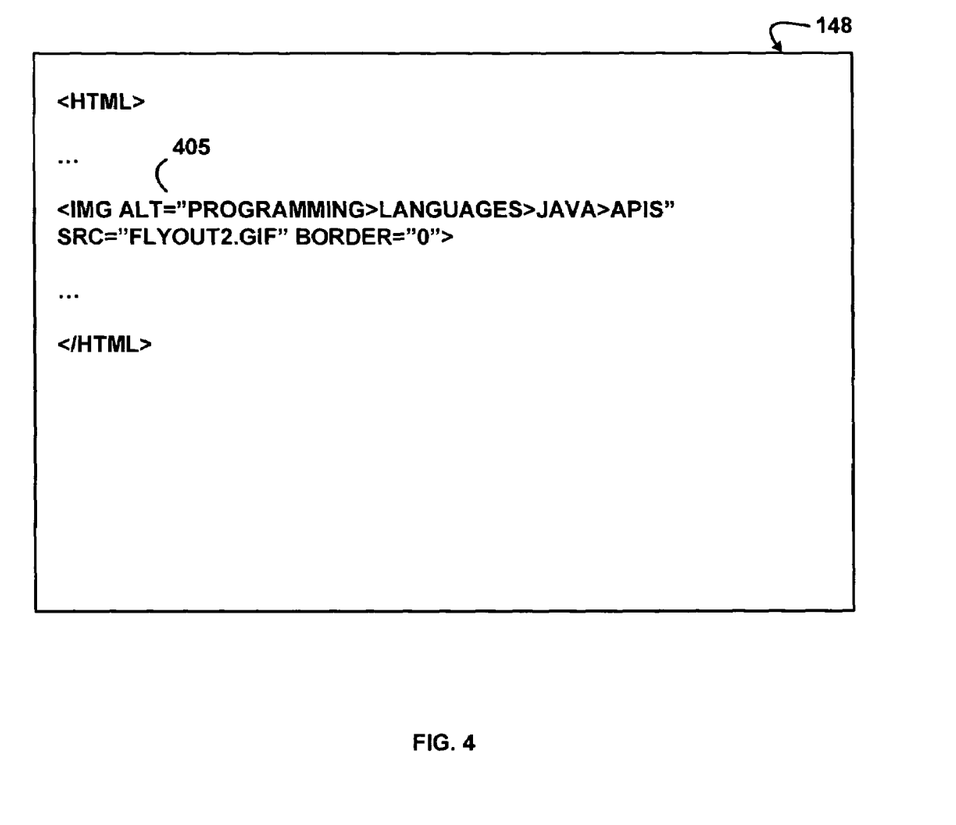
FIG. 4 depicts a block diagram of example source data and control tags for the search results page, according to an embodiment of the invention.

FIG. 4 depicts a block diagram of example source data and control tags for the search results page 148, according to an embodiment of the invention. The search results page 148 includes a context tag 405, which the browser 180 interprets to create the contextual flyout 205 (FIG. 2) after the search results are selected. The context tag 405 includes contextual information about the associated search results. The context tag 405 illustrated in FIG. 4 is an alt tag, but in other embodiments, the context tag 405 may be a flyout tag, or any other appropriate tag that, when interpreted upon selection of the search results, causes the contextual information to be displayed. Although the example search results page 148 is illustrated using the HTML (HyperText Markup Language) format, in other embodiments any appropriate format may be used.

Figure 5:
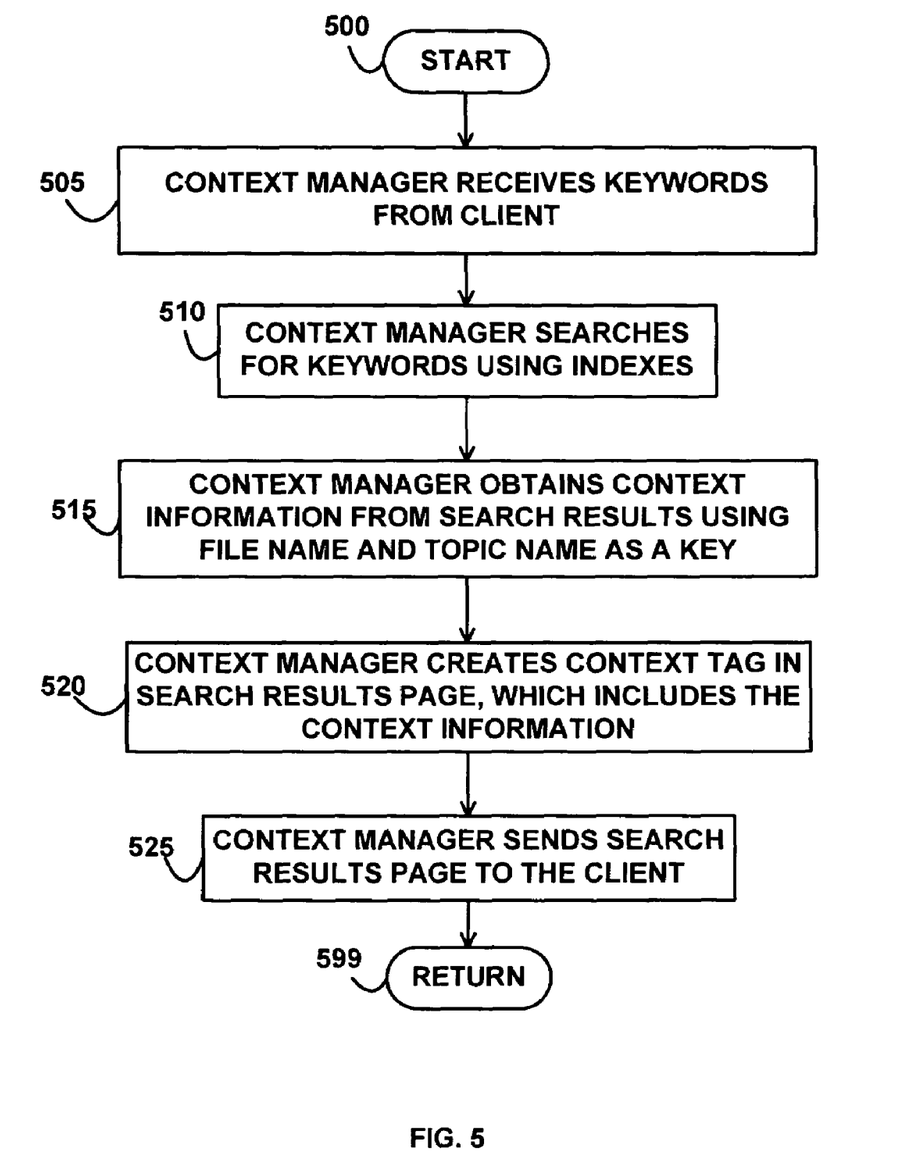
FIG. 5 depicts a flowchart of example processing for a context manager, according to an embodiment of the invention.

FIG. 5 depicts a flowchart of example processing for the context manager 144, according to an embodiment of the invention. Control begins at block 500. Control then continues to block 505 where the context manager 144 receives a search keyword(s) from the browser 180 at the client 132. Control then continues to block 510 where the context manager 144 searches for the keywords using the indexes 146. Control then continues to block 515 where the context manager 144 obtains context information from the search results using a file name and a topic name as a key into the indexes 146. Control then continues to block 520 where the context manager 144 creates the context tag 405 in the search results page 148 with the context information. The context manager 144 further creates a control tag in the search-results page 148, which when interpreted by the browser 180 causes a displaying of the context information in a separate frame from the search results, as previously described above with reference to FIG. 3.

Control then continues to block 525 where the context manager 144 sends the search results page 148 to the client 132 where the browser 180 interprets the control information (e.g., the context tag 405) and data in the search results page 148 (FIG. 4) and presents the rendered page 200 (FIG. 2) in response to a user selection of the search results. The browser 180 also presents the more detailed interface 300 (FIG. 3) in response to the selection of the icon 210 (FIG. 2). Control then continues to block 599 where the logic of FIG. 5 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A computer-implemented method comprising:
   receiving a keyword from a client;
   creating search results for the keyword via an index;
   determining context information from the search results using a file name and a topic name as a key into the index, wherein the context information comprises a category of the search results;
   creating a context tag in a search-results page, wherein the context tag comprises the context information, and wherein the context tag when interpreted in response to a user selection of the search results via a pointer passing over the search results causes the context information to be temporarily displayed overlaying a portion of the search results, and wherein the search results are adjusted within a user interface to allow the search results to be seen at a same time as the contextual-flyout information;
   creating a control tag in the search-results page, which when interpreted causes a displaying of the context information in a separate frame from the search results; and
   sending the search-results page to the client.

2. The method of claim 1, wherein the context tag further comprises an alt tag.

3. The method of claim 1, wherein the context tag further comprises a flyout tag.

4. A storage medium encoded with instructions, wherein the instructions when executed comprise:
   receiving a keyword from a client;
   creating search results for the keyword via an index;
   determining context information from the search results using a file name and a topic name as a key into the index, wherein the context information comprises a category of the search results;
   creating a context tag in a search-results page, wherein the context tag comprises the context information, and wherein the context tag when interpreted in response to a user selection of the search results via a pointer passing over the search results causes the context information to be temporarily displayed overlaying a portion of the search results, and wherein the search results are adjusted within a user interface to allow the search results to be seen at a same time as the contextual-flyout information;
   creating a control tag in the search-results page, which when interpreted causes a displaying of the context information in a separate frame from the search results; and
   sending the search-results page to the client.

5. The storage medium of claim 4, wherein the context tag further comprises an alt tag.

6. The storage medium of claim 4, wherein the context tag further comprises a flyout tag.

7. A computer system comprising:

a processor; and memory encoded with instructions, wherein the instructions when executed on the processor comprise:

receiving a keyword from a client, creating search results for the keyword via an index, determining context information from the search results using a file name and a topic name as a key into the index, wherein the context information comprises a category of the search results, creating a context tag in a search-results page, wherein the context tag comprises the context information, and wherein the context tag when interpreted in response to a user selection of the search results via a pointer passing over the search results causes the context information to be temporarily displayed overlaying a portion of the search results, and wherein the search results are adjusted within a user interface to allow the search results to be seen at a same time as the contextual-flyout information, creating a control tag in the search-results page, which when interpreted causes a displaying of the context information in a separate frame from the search results, and sending the search-results page to the client.

8. The computer system of claim 7, wherein the context tag further comprises an alt tag.

9. The computer system of claim 7, wherein the context tag further comprises a flyout tag.

10. A method for configuring a computer, wherein the method comprises:

configuring the computer to receive a keyword from a client;

configuring the computer to create search results for the keyword via an index;

configuring the computer to determine context information from the search results using a file name and a topic name as a key into the index, wherein the context information comprises a category of the search results;

configuring the computer to create a context tag in a search-results page, wherein the context tag comprises the context information, and wherein the context tag when interpreted in response to a user selection of the search results via a pointer passing over the search results causes the context information to be temporarily displayed overlaying a portion of the search results, and wherein the search results are adjusted within a user interface to allow the search results to be seen at a same time as the contextual-flyout information;

configuring the computer to create a control tag in the search-results page, which when interpreted causes a displaying of the context information in a separate frame from the search results; and configuring the computer to send the search-results page to the client.

11. The method of claim 10, wherein the context tag farther comprises an alt tag.

12. The method of claim 10, wherein the context tag further comprises a flyout tag.

* * * * *